Aug. 1, 1939.                J. E. STRIETELMEIER                2,168,006
                                  BUN PAN
                      Filed Aug. 4, 1938        2 Sheets-Sheet 1
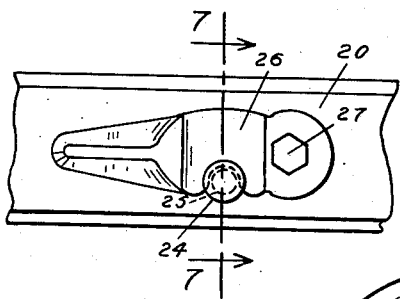
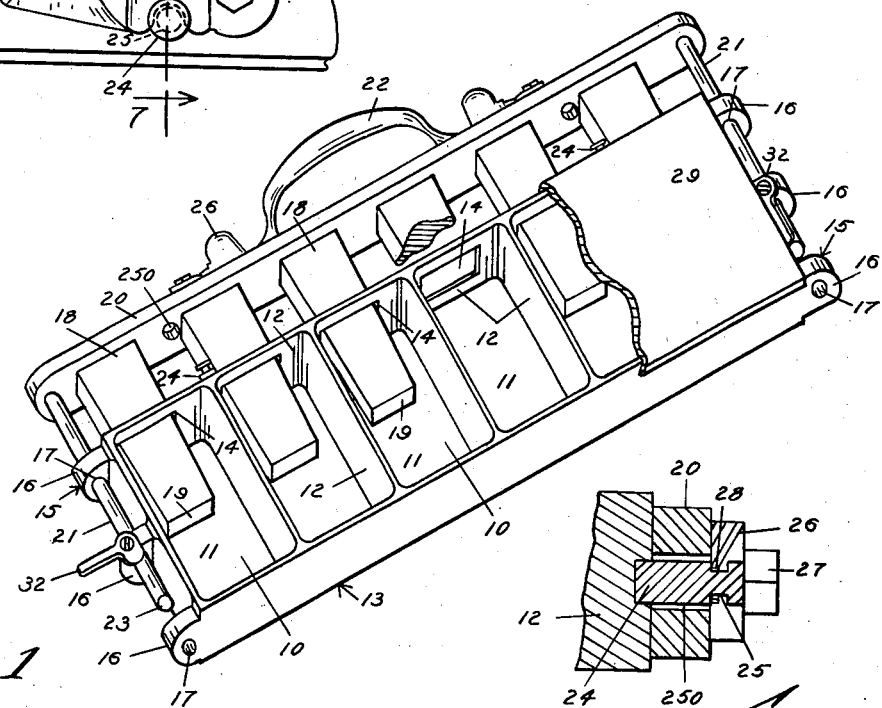
INVENTOR.
John E. Strietelmeier.
BY Murray Sackhoff & Paddack,
ATTORNEYS.

Aug. 1, 1939.    J. E. STRIETELMEIER    2,168,006
BUN PAN
Filed Aug. 4, 1938    2 Sheets-Sheet 2

INVENTOR.
John E. Strietelmeier.
BY Murray Sackhoff & Paddack.
ATTORNEYS.

UNITED STATES PATENT OFFICE 2,168,006

BUN PAN

John E. Strietelmeier, Cincinnati, Ohio, assignor to Bar-B-Buns, Inc., Cincinnati, Ohio, a corporation of Ohio Application August 4, 1938, Serial No. 223,067

8 Claims. (Cl. 53—6)

The present invention relates to bun pans and is particularly directed to improvements in pans provided with cores which are disposed centrally of the pan interior and adapted to form a central, elongated cavity in a product baked therein for the reception of a food product filler.

The objects of my invention are: to provide a means for rigidly positioning a core centrally of a bun pan interior, said means being located exteriorly of said pan and removable therefrom; to provide a means for guiding a core through an aperture in a side wall of a bun pan to a predetermined interior position and to preclude contact of the core with the confines of said aperture during the positioning operation; to provide an efficient means of removing the core from the finished baked product whilst the product is held in the pan; to provide a cover for the pan which forms a finished bun product of proper proportions; and to provide a bun pan unit which has the foregoing objects and improvements.

Other objects will be apparent from the following specification and drawings, in which:

Fig. 1 is a perspective view of my bun pan in an intermediate position of the pan assembly, parts being broken away.

Fig. 2 is a top plan view of the pan in baking position with the cover positioned thereon.

Fig. 6 is a detail front elevational view of the lock means for my pan.

Fig. 7 is an enlarged cross-sectional view taken on line 7—7 of Fig. 6.

Figure 3:
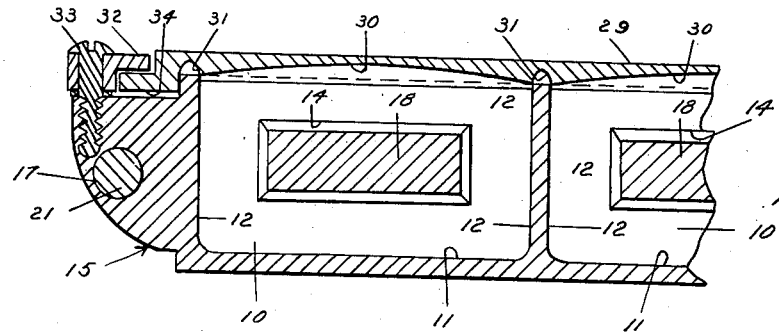
Fig. 3 is an enlarged cross-sectional view taken on line 3—3 of Fig. 2.

My invention consists of a number of bun pans 10 having bottoms 11 and four side walls 12, the pans being positioned in side by side longitudinal relationship to form a pan unit 13, Fig. 1. The pans are preferably made by a single casting of aluminum or other light-weight durable metal. A common transverse side wall of each pan comprising the unit is provided with a centrally disposed rectangular aperture 14 which is formed wholly through said side wall, Figs. 1 and 14. The pan unit has guideways 15 positioned at opposite longitudinal ends thereof which preferably take the form of integral, rounded extensions 16 having annular, aligned holes 17 formed therein.

Figure 4:
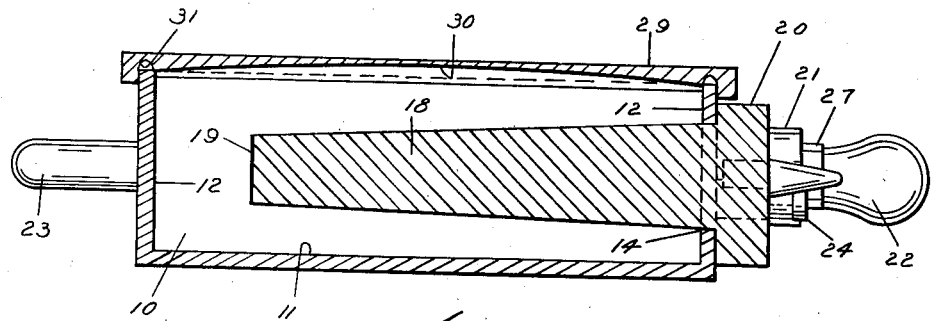
Fig. 4 is an enlarged cross-sectional view taken on line 4—4 of Fig. 2.

To form a baked product having a longitudinal central cavity therein in the pans 10 of my unit, I provide a number of tapered cores 18 which are positioned centrally of the bun pan with their reduced portion 19 located adjacent a pan side wall opposed to the side wall having the aperture 14, Fig. 4. A removable core positioning member which is in the form of an elongated bar 20 is disposed transversely of the pan unit and has integrally mounted thereto the cores 18, which extend at right angles therefrom. The cores are spaced on the member in alignment with the apertures 14 formed in the pan side walls. As shown in Fig. 2 the core positioning member engages the exterior surface of the pan unit upon the side of the unit provided with the apertures 14. Guide rods 21 are mounted on opposite sides of the core positioning member and are disposed thereon in alignment with the guideways 15. The positioning member has also a handle 22 located centrally thereof for the manual insertion and removal of the cores into and from the pan interiors. When the pan is in operative baking condition, the guide rods 21 have an extended portion 23 which projects beyond the body portion of the pan unit. The function of these portions will be indicated hereafter.

It is necessary to the efficient assembly of my pans that the cores, previously provided with a suitable form of baking grease, do not come in contact with a surface which would remove the film. To position the cores centrally of the pan interiors, without contact of the cores with a film removing surface, the extended portions 23 of the guide rods 21 are first inserted in the holes 17 formed in the forward extensions on the pan unit, thereby aligning the cores centrally of the apertures in the pans. Upon inward actuation of the core positioning member the reduced portion of the cores having a cross-sectional form smaller than the dimensions of the aperture enter the pans through said apertures therein, the guideways serving to impart a horizontal movement to said cores thus precluding contact of the cores with the confines of the apertures until the cores have reached their operative baking positions, as indicated in Fig. 2. In the latter position the enlarged portions of the cores are formed to engage the confines of the apertures to completely close them thus preventing emission of pan contents through the apertures.

The means provided for locking the core positioning member to the exterior side wall of the pan unit comprises a lug 24 which has a reduced portion 25 adjacent its outer end. The inner end of the lug is mounted upon the side wall of the pan unit as most clearly indicated in Fig. 7. The lug is adapted to enter and extend beyond an aperture 250 in the core positioning member, the reduced portion of the lug thereby being disposed in a position to receive a latch means 26. The latch means 26 is pivotally mounted on the core positioning member by means of a bolt 27 and has an inclined circular cutaway portion 28 which cooperates with the reduced portion on the lug 24 to ridgedly fasten the core positioning member to the exterior side wall of the pan unit.

Figure 5:
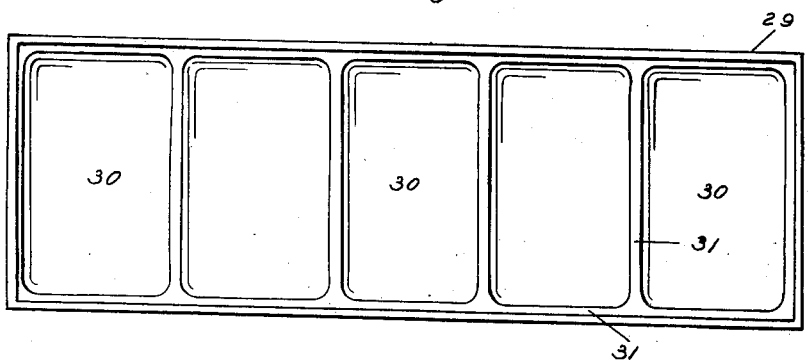
Fig. 5 is an interior plan view of the cover for the pan.

A removable cover 29 for the pan unit has interior concave portions 30 disposed above each pan and also a series of grooves 31 formed therein which conform to the configuration of the top edge of the pan side walls and are adapted to partially receive therein said top edge, Figs. 3, 4, and 5. The cover is fastened to the pan unit by means of rotatable inclined bosses 32 which are pivoted to the top portion of the central guideway by means of bolts 33, Fig. 3. The bosses engage an extension 34 formed on the cover adjacent the position of the bosses. The concave portions in the cover permit the dough product baked in the pan to rise a little above the desired height of the finished baked product so that on cooling, the contraction of said finished product will conform to the desired dimension sought to be attained. It will also be noted that a smooth inside connection between the cover and the pan side wall (Figs. 3 and 4) results by providing a concave form to the cover thus imparting a form to the baked product which needs no further cutting or forming operation.

In operation the core positioning member and the cores integrally mounted thereon are manually immersed in a suitable substance for greasing the cores and the extended portion of the guide rods inserted in the holes 17 in the guideways 16. The cores are thereby positioned in alignment with the apertures in the pan side walls and the entire member is then moved to a position indicated in Fig. 2, the guideways serving to preclude contact of the cores with the confines of said apertures during the positioning operation. The lock means 26 function to ridgedly hold the cores centrally of the interior of each pan whilst the enlarged core portion completely closes the apertures 14 as indicated in Fig. 4. A suitable dough material is then poured or placed in the pans 11 which have previously been provided with suitable greasing substance and thereafter the cover is fastened to the top portion of the pan unit by means of bosses 32. The pan and its contents are then placed in a baking oven and remain therein until a finished bun product has been baked. The lock means 26 is then released and the unit moved sharply against a plane surface which contacts the extended portions 23 on the guide rods. This action releases the cores from the interior of the formed cavities in the buns and thereafter the core positioning member and the cores are manually extracted from the pan unit. The cover is then removed and the finished baked products are taken from the pan interiors.

What is claimed is:

1. A pan unit comprising a number of pans having bottoms and side walls and disposed in side by side longitudinal relationship, an aperture formed wholly through and centrally of each pan side wall located on one common side of the unit, a removable core positioning member, a number of tapered cores formed integrally with the member and disposed thereon in alignment with the apertures in the pans, guides for the member located adjacent opposite longitudinal sides of the unit, elongated guide rods on the member adapted to be received in the guides, and cooperating lock means on the unit and the member to rigidly hold the cores centrally of the pan interiors, the large end of the core functioning to completely close the aperture in said pans and the free reduced end of the cores held adjacent the side wall of the pan opposed to the side wall having the aperture.

2. A pan unit comprising a plurality of pans having bottoms and side walls and positioned in side by side longitudinal relationship, an aperture formed wholly through a common transverse side wall of each pan, a removable core positioning member disposed transversely of the unit and engaging the exterior surface of the pan side walls having the apertures, a plurality of tapered cores extending longitudinally from the member and positioned thereon in alignment with the apertures, guideways located adjacent the longitudinal end portions of the unit, guide-rods on the member adapted to be received in the guideways, and cooperating lock means on the unit and the member to rigidly hold the cores centrally of the pan interiors whereby the enlarged portion of said cores completely close the apertures in the pan walls and the reduced core ends are disposed adjacent a pan side wall opposed to the side wall having the aperture.

3. A pan unit comprising a plurality of pans having bottoms and side walls and positioned in side by side longitudinal relationship, a removable cover for the unit having interior concave portions disposed above each pan and a series of grooves therein conforming to the configuration of the top edge of the pan side walls and adapted to partially receive therein said top edge, an aperture formed wholly through a common transverse side wall of each pan, a removable core positioning member disposed transversely of the unit and engaging the exterior surface of the pan side walls having the apertures, a plurality of tapered cores extending longitudinally from the member and positioned thereon in alignment with the apertures, guideways located adjacent the longitudinal end portions of the unit, guide-rods on the member adapted to be received in the guideways, and cooperating lock means on the unit and the member to rigidly hold the cores centrally of the pan interiors whereby the enlarged portion of said cores completely close the apertures in the pan walls and the reduced core ends are disposed adjacent a pan side wall opposed to the side wall having the aperture.

4. A bun pan having a bottom and side walls, one side wall having a central aperture formed wholly therethrough, a removable core positioning member engaging the exterior surface of the side wall having the aperture, a tapered core formed integrally with the member and adapted to be received in the aperture to completely close said aperture with its enlarged portion, its free reduced end being located adjacent the side wall opposed to the side wall having the aperture, means for guiding the core into the aperture and means for locking the member in engagement with the side wall having the aperture.

5. A bun pan having a bottom and side walls, one side wall having a central aperture formed wholly therethrough, a removable core positioning member disposed exteriorly of the pan adjacent the side wall having the aperture, a tapered core formed integrally with the member and adapted to be received in the aperture, means for guiding the core into said aperture and means for locking the member to the pan in a position to completely close said aperture with the enlarged portion of the core and rigidly hold said core centrally of the pan interior with its free reduced end located adjacent a pan side wall opposed to the side wall having the aperture.

6. A bun pan having a bottom and side walls, one side wall having a central aperture formed wholly therethrough, a tapered core adapted to be received in the aperture, means located exteriorly of the pan side wall having the aperture for guiding the core into said aperture, and lock means on the pan for positioning the core centrally of the pan interior, with the enlarged portion of the core completely closing the aperture and the reduced free end of the core positioned adjacent a pan side wall opposed to the side wall having the aperture.

7. A bun pan having a bottom and side walls, one side wall having an aperture formed therethrough, a tapered core, means located exteriorly of the pan for removably positioning the core in the aperture and centrally of the pan interior.

8. A bun pan having a bottom and side walls, one side wall having an aperture formed therethrough, a tapered core, means located exteriorly of the pan for removably positioning the core in the aperture and centrally of the pan interior, and a guide for the means to control the positioning of the core in the aperture.

JOHN E. STRIETELMEIER.